United States Patent
Johnson et al.

(10) Patent No.: US 10,218,044 B2
(45) Date of Patent: Feb. 26, 2019

(54) JOHNSON LITHIUM OXYGEN ELECTROCHEMICAL ENGINE

(71) Applicant: Johnson IP Holding, LLC, Atlanta, GA (US)

(72) Inventors: Lonnie G. Johnson, Atlanta, GA (US); Tedric D. Campbell, Lithia Springs, GA (US)

(73) Assignee: Johnson IP Holding, LLC, Atlanta, GA (US)

(*) Notice: Subject to any disclaimer, the term of this patent is extended or adjusted under 35 U.S.C. 154(b) by 53 days.

(21) Appl. No.: 15/408,991

(22) Filed: Jan. 18, 2017

(65) Prior Publication Data

US 2017/0214106 A1 Jul. 27, 2017

Related U.S. Application Data

(60) Provisional application No. 62/281,875, filed on Jan. 22, 2016.

(51) Int. Cl.
| | |
|---|---|
| *H01M 12/08* | (2006.01) |
| *H01M 4/38* | (2006.01) |
| *H01M 4/86* | (2006.01) |
| *H01M 8/04276* | (2016.01) |
| *H01M 12/02* | (2006.01) |
| *H01M 10/615* | (2014.01) |
| *H01M 10/654* | (2014.01) |
| *H01M 10/652* | (2014.01) |
| *H01M 10/617* | (2014.01) |

(Continued)

(52) U.S. Cl.
CPC ........... *H01M 12/08* (2013.01); *H01M 4/382* (2013.01); *H01M 4/8621* (2013.01); *H01M 8/04276* (2013.01); *H01M 10/615* (2015.04); *H01M 10/617* (2015.04); *H01M 10/652* (2015.04); *H01M 10/654* (2015.04); *H01M 10/655* (2015.04); *H01M 12/02* (2013.01); *H01M 2004/027* (2013.01); *H01M 2004/8689* (2013.01); *H01M 2300/0048* (2013.01); *Y02E 60/128* (2013.01)

(58) Field of Classification Search
None
See application file for complete search history.

(56) References Cited

U.S. PATENT DOCUMENTS

| | | |
|---|---|---|
| 3,237,078 A | 2/1966 | Mallory |
| 3,393,355 A | 7/1968 | Whoriskey et al. |

(Continued)

OTHER PUBLICATIONS

Obrovac et al, "Reversible Cycling of Crystalline Silicon Powder," Journal of the Electrochemical Society, vol. 154, No. 2, pp. A103-A108 (2007).

(Continued)

*Primary Examiner* — Alix E Eggerding
(74) *Attorney, Agent, or Firm* — Panitch Schwarze Belisario & Nadel LLP

(57) ABSTRACT

A rechargeable lithium air battery is provided. The battery contains a ceramic separator forming an anode chamber, a molten lithium anode contained in the anode chamber, an air cathode, and a non-aqueous electrolyte. The cathode has a temperature gradient comprising a low temperature region and a high temperature region, and the temperature gradient provides a flow system for reaction product produced by the battery.

19 Claims, 8 Drawing Sheets

(51) Int. Cl.
*H01M 10/655* (2014.01)
*H01M 4/02* (2006.01)

(56) References Cited

U.S. PATENT DOCUMENTS

| | | | |
|---|---|---|---|
| 4,303,877 A | 12/1981 | Meinhold | |
| 4,614,905 A | 9/1986 | Petersson et al. | |
| 4,654,281 A | 3/1987 | Anderman et al. | |
| 4,719,401 A | 1/1988 | Altmejd | |
| 4,803,134 A | 2/1989 | Sammells | |
| 5,270,635 A | 12/1993 | Hoffman et al. | |
| 5,291,116 A | 3/1994 | Feldstein | |
| 5,314,765 A | 5/1994 | Bates | |
| 5,336,573 A | 8/1994 | Zuckerbrod et al. | |
| 5,338,625 A | 8/1994 | Bates et al. | |
| 5,362,581 A | 11/1994 | Chang et al. | |
| 5,387,857 A | 2/1995 | Honda et al. | |
| 5,411,592 A | 5/1995 | Ovshinsky et al. | |
| 5,445,906 A | 8/1995 | Hobson et al. | |
| 5,455,126 A | 10/1995 | Bates et al. | |
| 5,512,147 A | 4/1996 | Bates et al. | |
| 5,561,004 A | 10/1996 | Bates et al. | |
| 5,567,210 A | 10/1996 | Bates et al. | |
| 5,569,520 A | 10/1996 | Bates | |
| 5,597,660 A | 1/1997 | Bates et al. | |
| 5,612,152 A | 3/1997 | Bates | |
| 5,654,084 A | 8/1997 | Egert | |
| 5,778,515 A | 7/1998 | Menon | |
| 5,783,928 A | 7/1998 | Okamura | |
| 5,811,205 A | 9/1998 | Andrieu et al. | |
| 5,821,733 A | 10/1998 | Turnbull | |
| 6,168,884 B1 | 1/2001 | Neudecker et al. | |
| 6,387,563 B1 | 5/2002 | Bates | |
| 6,413,285 B1 | 7/2002 | Chu et al. | |
| 7,691,536 B2 | 4/2010 | Johnson | |
| 8,778,546 B2 | 7/2014 | Farmer | |
| 2005/0095506 A1 | 5/2005 | Klaassen | |
| 2005/0100793 A1 | 5/2005 | Jonghe et al. | |
| 2013/0157149 A1* | 6/2013 | Peled | H01M 4/38 429/405 |
| 2014/0065456 A1* | 3/2014 | Bhavaraju | H01M 10/36 429/81 |
| 2017/0179521 A1* | 6/2017 | Sakamoto | H01M 10/0562 |

OTHER PUBLICATIONS

Limthongkul et al, "Electrochemically-Driven Solid State Amorphization in Lithium-Silicon Alloys and Implications for Lithium Storage," Acta Materialia, vol. 51, pp. 1103-1113 (2003).

Datta et al, "Silicon and Carbon Based Composite Anodes for Lithium Ion Batteries," Journal of Power Sources, vol. 158, pp. 557-563 (2006).

Read et al, "Characterization of the Lithium/Oxygen Organic Electrolyte Battery," Journal of the Electrochemical Society, vol. 149, No. 9, pp. A1190-A1195 (2002).

Abraham et al, "A Polymer Electrolyte-Based Rechargeable Lithium/Oxygen Battery," Journal of the Electrochemical Society, vol. 143, No. 1, pp. 1-5 (1996).

Miles et al, "Cation Effects on the Electrode Reduction of Molten Nitrates," Journal of the Electrochemical Society, vol. 127, pp. 1761-1766 (1980).

Briant et al, "Ionic Conductivity in Lithium and Lithium-Sodium Beta Alumina," Journal of the Electrochemical Society, vol. 128, No. 9, pp. 1830-1834 (1981).

Wang et al, "Ionic Conductivities and Structure of Lithium Phosporus Oxynitride Glasses," Journal of Non-Crystalline Solids, vol. 183, pp. 297-306 (1995).

Kotobuki et al, "Fabrication of All-Solid-State Lithium Battery with Lithium Metal Anode Using Al2O3-Added Li7La3Zr2O12 Solid Electrolyte," Journal of Power Sources, vol. 196, pp. 7750-7754 (2011).

Kotobuki et al, "Compatibility of Li7La3Zr2O12 Solid Electrolyte to All-Solid-State Battery Using Li Metal Anode," Journal of the Electrochemical Society, vol. 157, No. 10, pp. A1076-A1079 (2010).

Miles, Melvin H., "Lithium Batteries Using Molten Nitrate Electrolytes," Battery Conference on Applications and Advances. The Fourteenth Annual, pp. 39-42 (1999).

Int'l Search Report and Written Opinion dated Mar. 16, 2017 in Int'l Application No. PCT/US2017/014035.

International Preliminary Report on Patentability dated Aug. 2, 2018 in International Application No. PCT/US2017/014035.

\* cited by examiner

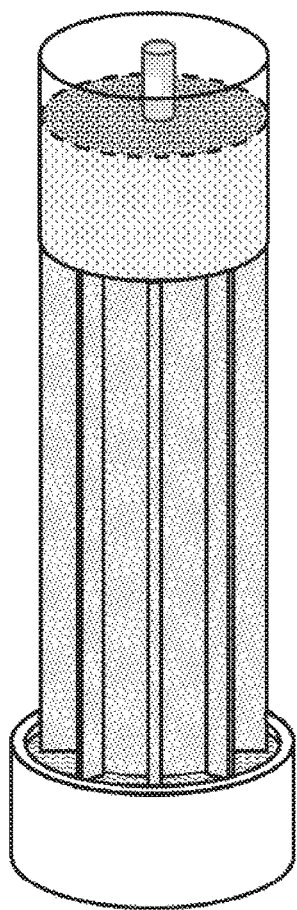
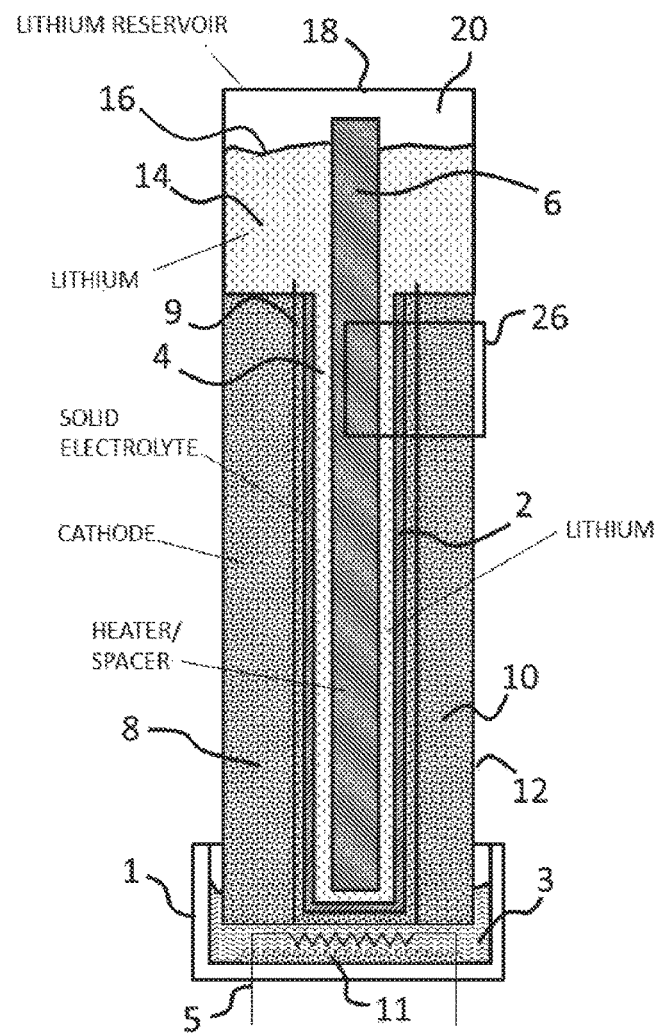
Fig. 2

JOHNSON LITHIUM OXYGEN ELECTROCHEMICAL ENGINE

CROSS-REFERENCE TO RELATED APPLICATION

This application claims priority to U.S. Provisional Application No. 62/281,875, filed Jan. 22, 2016, the disclosure of which is herein incorporated by reference.

BACKGROUND OF THE INVENTION

The need for high performance and reliable energy storage in the modern society is well documented. Lithium batteries represent a very attractive solution to these energy needs due to their superior energy density and high performance. However, available Li-ion storage materials limit the specific energy of conventional Li-ion batteries. While lithium has one of the highest specific capacities of any anode (3861 mAh/g), typical cathode materials such as $MnO_2$, $V_2O_5$, $LiCoO_2$ and $(CF)n$ have specific capacities less than 200 mAh/g.

Recently, lithium/oxygen ($Li/O_2$) or lithium air batteries have been suggested as a means for avoiding the limitations of today's lithium ion cells. In these batteries, lithium metal anodes are used to maximize anode capacity and the cathode capacity of Li air batteries is maximized by not storing the cathode active material in the battery. Instead, ambient $O_2$ is reduced on a catalytic air electrode to form $O_2^{2-}$, where it reacts with $Li^+$ ions conducted from the anode. Aqueous lithium air batteries have been found to suffer from corrosion of the Li anode by water and suffer from less than optimum capacity because of the excess water required for effective operation.

Abraham and Jiang (*J. Electrochem. Soc.*, 1996, 143 (1), 1-5) reported a non-aqueous $Li/O_2$ battery with an open circuit voltage close to 3 V, an operating voltage of 2.0 to 2.8 V, good coulomb efficiency, and some re-chargeability, but with severe capacity fade, limiting the lifetime to only a few cycles. Further, in non-aqueous cells, the electrolyte has to wet the lithium oxygen reaction product in order for it to be electrolyzed during recharge. It has been found that the limited solubility of the reaction product in available organic electrolytes necessitates the use of excess amounts of electrolyte to adequately wet the extremely high surface area nanoscale discharge deposits produced in the cathode. Thus, the required excess electrolyte significantly decreases high energy density that would otherwise be available in lithium oxygen cells.

Operation of $Li/O_2$ cells depends on the diffusion of oxygen into the air cathode. Oxygen absorption is a function of the electrolyte's Bunsen coefficient ($\alpha$), electrolyte conductivity ($\sigma$), and viscosity ($\eta$). It is known that as the solvent's viscosity increases, there are decreases in lithium reaction capacity and Bunsen coefficients. Additionally, the electrolyte has an even more direct effect on overall cell capacity as the ability to dissolve reaction product is crucial. This problem has persisted in one form or another in known batteries.

Indeed, high rates of capacity fade remain a problem for non-aqueous rechargeable lithium air batteries and have represented a significant barrier to their commercialization. The high fade is attributed primarily to parasitic reactions occurring between the electrolyte and the mossy lithium powder and dendrites formed at the anode-electrolyte interface during cell recharge, as well as the passivation reactions between the electrolyte and the $LiO_2$ radical which occurs as an intermediate step in reducing $Li_2O_2$ during recharge.

During recharge, lithium ions are conducted across the electrolyte separator with lithium being plated at the anode. The recharge process can be complicated by the formation of low density lithium dendrites and lithium powder as opposed to a dense lithium metal film. In addition to passivation reactions with the electrolyte, the mossy lithium formed during recharge can be oxidized in the presence of oxygen into mossy lithium oxide. A thick layer of lithium oxide and/or electrolyte passivation reaction product on the anode can increase the impedance of the cell and thereby lower performance. Formation of mossy lithium with cycling can also result in large amounts of lithium being disconnected within the cell and thereby being rendered ineffective.

Lithium dendrites can penetrate the separator, resulting in internal short circuits within the cell. Repeated cycling causes the electrolyte to break down, in addition to reducing the oxygen passivation material coated on the anode surface. This results in the formation of a layer composed of mossy lithium, lithium-oxide and lithium-electrolyte reaction products at the metal anode's surface which drives up cell impedance and consumes the electrolyte, bringing about cell dry out.

Attempts to use active (non lithium metal) anodes to eliminate dendritic lithium plating have not been successful because of the similarities in the structure of the anode and cathode. In such lithium air "ion" batteries, both the anode and cathode contain carbon or another electronic conductor as a medium for providing electronic continuity. Carbon black in the cathode provides electronic continuity and reaction sites for lithium oxide formation. To form an active anode, graphitic carbon is included in the anode for intercalation of lithium and carbon black is included for electronic continuity. Unfortunately, the use of graphite and carbon black in the anode can also provide reaction sites for lithium oxide formation. At a reaction potential of approximately 3 volts relative to the low voltage of lithium intercalation into graphite, oxygen reactions would dominate in the anode as well as in the cathode. Applying existing lithium ion battery construction techniques to lithium oxygen cells would allow oxygen to diffuse throughout all elements of the cell structure. With lithium/oxygen reactions occurring in both the anode and cathode, creation of a voltage potential differential between the two is difficult. An equal oxidation reaction potential would exist within the two electrodes, resulting in no voltage.

As a solution to the problem of dendritic lithium plating and uncontrolled oxygen diffusion, known aqueous and non-aqueous lithium air batteries have included a barrier electrolyte separator, typically a ceramic material, to protect the lithium anode and provide a hard surface onto which lithium can be plated during recharge. However, formation of a reliable, cost effective barrier has been difficult. A lithium air cell employing a protective solid state lithium ion conductive barrier as a separator to protect lithium in a lithium air cell is described in U.S. Pat. No. 7,691,536 of Johnson. Thin film barriers have limited effectiveness in withstanding the mechanical stress associated with stripping and plating lithium at the anode or the swelling and contraction of the cathode during cycling. Moreover, thick lithium ion conductive ceramic plates, while offering excellent protective barrier properties, are extremely difficult to fabricate, add significant mass to the cell, and are rather expensive to make.

As it relates to the cathode, the dramatic decrease in cell capacity as the discharge rate is increased is attributed to the accumulation of reaction product in the cathode. At high discharge rate, oxygen entering the cathode at its surface does not have an opportunity to diffuse or otherwise transition to reaction sites deeper within the cathode. The discharge reactions occur at the cathode surface, resulting in the formation of a reaction product crust that seals the surface of the cathode and prevents additional oxygen from entering. Starved of oxygen, the discharge process cannot be sustained.

Another significant challenge with lithium air cells has been electrolyte stability within the cathode. The primary discharge product in lithium oxygen cells is $Li_2O_2$. During recharge, the resulting lithium oxygen radical, $LiO_2$, an intermediate product which occurs while electrolyzing $Li_2O_2$, aggressively attacks and decomposes the electrolyte within the cathode, causing it to lose its effectiveness.

High temperature molten salts have been suggested as an alternative to organic electrolytes in non-aqueous lithium-air cells. U.S. Pat. No. 4,803,134 of Sammells describes a high lithium-oxygen secondary cell in which a ceramic oxygen ion conductor is employed. The cell includes a lithium-containing negative electrode in contact with a lithium ion conducting molten salt electrolyte, LiF—LiCl—$Li_2O$, separated from the positive electrode by the oxygen ion conducting solid electrolyte. The ion conductivity limitations of available solid oxide electrolytes require that such a cell be operated in the 700° C. range or higher in order to have reasonable charge/discharge cycle rates. The geometry of the cell is such that the discharge reaction product accumulates within the molten salt between the anode and the solid oxide electrolyte. The required space is an additional source of impedance within the cell.

TABLE 1

Physical properties of Molten Nitrate Electrolytes

| System | Mol % | Melt Temp ° C. | κ (S/cm) @570K | at Mol % |
|---|---|---|---|---|
| $LiNO_3$—$KNO_3$ | 42-58 | 124 | 0.687 | 50.12 mol % $LiNO_3$ |
| $LiNO_3$—$RbNO_3$ | 30-70 | 148 | 0.539 | 50 mol % $RbNO_3$ |
| $NaNO_3$—$RbNO_3$ | 44-56 | 178 | 0.519 | 50 mol % $RbNO_3$ |
| $LiNO_3$—$NaNO_3$ | 56-44 | 187 | 0.985 | 49.96 mol % $NaNO_3$ |
| $NaNO_3$—$KNO_3$ | 46-54 | 222 | 0.66 | 50.31 mol % $NaNO_3$ |
| $KNO_3$—$RbNO_3$ | 30-70 | 290 | 0.394 | 70 mol % $RbNO_3$ |

Molten nitrates also offer a viable solution and the physical properties of molten nitrate electrolytes are summarized in Table 1 (taken from *Lithium Batteries Using Molten Nitrate Electrolytes* by Melvin H. Miles; Research Department (Code 4T4220D); Naval Air Warfare Center Weapons Division; China Luke, Calif. 93555-61000).

The electrochemical oxidation of the molten $LiNO_3$ occurs at about 1.1 V vs. Ag+/Ag or 4.5 V vs. Li+/Li. The electrochemical reduction of $LiNO_3$ occurs at about −0.9V vs. Ag+/Ag, and thus these two reactions define a 2.0V electrochemical stability region for molten $LiNO_3$ at 300° C. and are defined as follows:

(Equation 1)

(Equation 2)

This work with molten nitrates was not performed with lithium air cells in mind; however, the effective operating voltage window for the electrolyte is suitable for such an application. As indicated by the reaction potential line in FIG. 1, applying a recharge voltage of 4.5V referenced to the lithium anode can cause lithium nitrate to decompose to lithium nitrite, releasing oxygen. On the other hand, lithium can reduce $LiNO_3$ to $Li_2O$ and $LiNO_2$. This reaction occurs when the $LiNO_3$ voltage drops below 2.5V relative to lithium. As long as there is dissolved oxygen in the electrolyte, the reaction kinetics will favor the lithium oxygen reactions over $LiNO_3$ reduction. Oxide ions are readily converted to peroxide ($O_2^{2-}$) and aggressive superoxide ($O_2^-$) ions in $NaNO_3$ and $KNO_3$ melts (M. H. Miles et al., *J. Electrochem. Soc.*, 127,1761 (1980)).

A need remains for a lithium air cell which overcomes problems associated with those of the prior art.

BRIEF SUMMARY OF THE INVENTION

A rechargeable lithium air battery comprises a ceramic separator forming an anode chamber, a molten lithium anode contained in the anode chamber, an air cathode, and a non-aqueous electrolyte, wherein the cathode has a temperature gradient comprising a low temperature region and a high temperature region, and wherein the temperature gradient provides a flow system for reaction product produced by the battery.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 2 is a schematic of a battery cell according to one embodiment of the present invention;

DETAILED DESCRIPTION OF THE INVENTION

Figure 1:
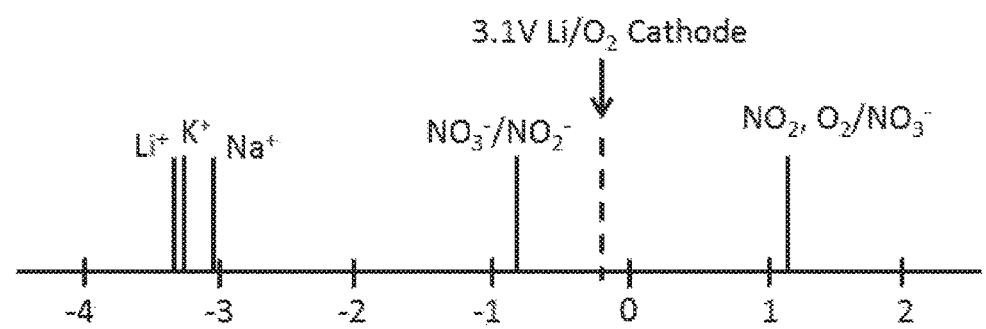
FIG. 1 is a diagram depicting electrochemical reaction potentials in molten lithium nitrate at 300° C.

This invention relates generally to energy storage, and more particularly to a lithium air electrochemical cell. For the purposes of this disclosure, the terms lithium air cell, lithium air electrochemical engine and lithium oxygen battery are used interchangeably.

The present invention provides a rechargeable lithium air cell having a high rate of cell charge/discharge with limited capacity fade, high energy density, high power density, and the ability to operate on oxygen from ambient air. As such, it removes significant barriers that have prevented the commercialization of lithium air cells. For example, the formation of mossy lithium powder and dendrites at the anode-electrolyte interface during cell recharge are eliminated by the use of molten lithium supplied as a flow reactant to the anode side of a stable solid state ceramic electrolyte. The battery according to the invention also includes a flow system for removing reaction product from the cathode.

The reactions of lithium with oxygen are as follows:

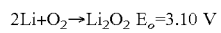

$$2Li + O_2 \rightarrow Li_2O_2 \quad E_o = 3.10 \text{ V}$$

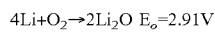

$$4Li + O_2 \rightarrow 2Li_2O \quad E_o = 2.91 \text{ V}$$

To avoid problems associated with past approaches to lithium air cells, a lithium air cell according to the invention may be operated at a wide range of temperatures in the range of 20° C. to 700° C., which include elevated temperatures, such as the preferred temperatures of about 200° C. to 450° C., more preferably about 200° to about 250° C. The solvent in the electrolyte may be selected based on the preferred operating temperature of the specific battery. Operation at elevated temperature enables faster kinetics for higher power density, thus eliminating a major issue associated with lithium air technology. Further, operation at elevated temperature also allows for the use of high temperature organic electrolytes and inorganic, molten salt electrolyte solutions that have high electrochemical stability, thus avoiding another of the major problems that has plagued conventional approaches to lithium air cells. Selected inorganic molten salts have good solubility of lithium/oxygen reaction products, thus allowing better control of cell kinetics.

The rechargeable air battery according to the invention contains a ceramic separator which forms an anode chamber, a molten lithium anode contained in the anode chamber, an air cathode, and a non-aqueous electrolyte. Each of these components will be described in more detail below.

The cell further comprises a flow system which is provided by a temperature gradient across the cathode. More specifically, the cathode has two temperature regions: a high temperature region (preferably located near the anode, where the reaction takes place) and a low temperature region which is located further away from the anode. As the electrolyte circulates through the cell during discharge, the reaction product produced by the battery migrates from the high temperature region to the low temperature region.

The anode chamber is preferably formed by a sealed ceramic enclosure that is lithium ion conductive and which functions as the separator for the battery. Preferably, the ceramic material is stable in contact with lithium metal and protects the anode from ambient oxygen and moisture. Preferred materials include lithium ion conducting glasses such as lithium beta alumina, lithium phosphate glass, lithium lanthanum zirconium oxide (LLZO), $Al_2O_3$: $Li_7La_3Zr_2O_{12}$, lithium aluminum germanium phosphate (LAGP), and lithium aluminum titanium phosphate (LATP). In a preferred embodiment, the anode chamber is maintained at about 20° C. to about 200° C., more preferably at about 175° C. to about 200° C., most preferably about 175° C. to about 195° C.

The anode comprises metallic lithium in a molten state; lithium has a melting point of about 180° C. The benefit of the molten lithium anode is that it limits undesirable dendrite growth in the cell.

The non-aqueous electrolyte is chosen for stability in contact with lithium. Thus, a breach in the ceramic enclosure will not result in rapid reactions, particularly because air ingress into the cell will be controlled. Preferred electrolytes include molten inorganic salts, for example, alkali nitrates such as lithium and sodium nitrate, alkali chlorides and bromides such as lithium, potassium and sodium chlorides and bromides, alkali carbonates such as sodium and lithium carbonates, as well as sodium nitrate-potassium nitrate ($NaNO_3$—$KNO_3$) eutectic mixtures and silane and siloxane-based compounds including, for example, hexamethylcyclotrisiloxane, octamethylcyclotetrasiloxane, decamethylcyclopentasiloxane, and dodecamethylhexatetrasiloxane with or without polyethylene oxide groups.

The inorganic salt, silane, or siloxane in the electrolyte is present in a solvent. The solvent is not limited, and may be selected based on the preferred operating temperature of the battery. A preferred solvent is LiCl—KCl eutectic, which works at a temperature of 350° C. to 450° C. The temperature of the electrolyte may be controlled with a heater and is preferably about 200° C. to 450° C.

The air cathode or positive electrode is porous so that oxygen can penetrate through the pores and form lithium peroxide as the reaction product; electrolyte also flows through the porous cathode. The cathode is preferably formed from a porous ceramic material which is lithium conductive and which is infiltrated or impregnated with a metal nitrate such as silver nitrate or a carbon material such as carbon fibers, carbon black, or carbon foam. Preferred porous ceramic materials include LLZO, LAGP, LATP, and lithium oxyanions such as lithium carbonate; most preferred is LLZO. In another preferred embodiment, the cathode contains a carbon material, a heat resistance polymer binder such as polyimide, and a metal oxide catalyst. An exemplary cathode material of this type contains about 60% by weight vapor grown carbon fibers, about 30% polyimide binder, and about 10% manganese dioxide. The cathode may also be constructed of electrically conductive sintered metal oxide powder, sintered metal nitride, carbon, or sintered silicon carbide.

As a preferred example, porous lithium lanthanum zirconium oxide (LLZO) ceramic substrates are prepared by pressing 10-15 grams of LLZO powder into a disc at 1000 psi. The disc is densified by placing in a furnace at 1000° C. for a period of 1 hour. The disc is then impregnated with a metal nitrate such as silver nitrate to form the cathode.

A thermodynamic process is employed to remove and supply electrolyte to cathode reaction sites. In its basic configuration, a temperature gradient is maintained across the structure of the cathode wetted by the electrolyte. The active charge/discharge reaction region of the cell forms the higher temperature region of the gradient. As a result of the temperature gradient, during discharge, reaction product accumulated within the electrolyte at the higher temperature region migrates to the lower temperature region where it precipitates/solidifies. The configuration of the cell is such that reaction product can accumulate within the lower temperature region physically away from the higher temperature reaction region of the cell. Accumulation of reaction product in the lower temperature region prevents it from significantly affecting the charge/discharge cell kinetics occurring in the higher temperature cathode reaction region. Ultimately, the cooled and settled reaction product will become re-dissolved in the electrolyte. This flow system is a key attribute of the inventive batteries.

In an alternative embodiment, the cell contains a pump to circulate the electrolyte across the temperature gradient. Such a cell contains a molten or another appropriate electrolyte reservoir and a temperature control system for controlling the relative temperatures of the cathode and the reservoir. Further, a heating element is employed for electrolyte temperature control. The pump system cycles electrolyte between the cathode and the electrolyte reservoir, which are adjacent to and in fluid communication with each other. Operation is such that during discharge, the cathode is maintained at a temperature that is elevated above that of the electrolyte reservoir. Reaction product dissolved in the electrolyte at high temperature in the cathode is carried to the electrolyte reservoir where it precipitates due to the lower temperature therein. In contrast, during charge, heat is supplied to the reservoir to maintain solubility of reaction product into the electrolyte. During charge, the electrolyte carries dissolved reaction product from the reservoir to the cathode, where it is electrolyzed. Oxygen is released and lithium ions are conducted through the ceramic separator such that lithium metal is plated at the anode. Electrolyte depleted of reaction product circulates back to the reservoir where it dissolves and carries more reaction product to the cathode as the charge process continues. The configuration is such that the reaction product is temporarily stored as a solid in the electrolyte reservoir as opposed to the cathode. Operation in this manner enables the cathode to be maintained in an optimum configuration for maximum charge and discharge performance.

FIG. 2 is a schematic drawing of a molten lithium electrochemical cell according to an embodiment of the invention. The cell is cylindrical in shape with fins running lengthwise along the cylinder and radiating outward away from the core of the cell. The basic structure is supported by hollow solid electrolyte cylinder (anode chamber) 2 which extends the length of the cell and functions as the cell separator. Molten lithium metal 14 is contained within reservoir 18 at the top of the cell and inside annular cavity 4 such that molten lithium is free to flow down from reservoir 18 into annular cavity 4. The top level of the molten anode 16 is not expected to totally fill the headspace 20 of the cell. Electrical heater element 6 runs the length of the cell and is positioned to maintain the lithium in a molten state. Heater 6 is part of the core structure that forms annular cavity 4 between the heater and the inner wall of the solid electrolyte 2 where molten lithium 14 is contained. Lithium 14 serves as the anode of the cell. Fined cathode cylinder 8 is positioned over the outer surface of electrolyte cylinder 2. The core of the fin is shown by 9. Cathode 8 is a porous structure containing liquid electrolyte which, due to its finned structure, is configured to have a wicking effect to maintain distribution of electrolyte therein. The reaction in the cell occurs at the interface where the cathode touches the separator, which is the hotter (high temperature) region of the cathode. The reaction product will not settle in this hot portion of the cathode, but rather on the colder side of the cathode (low temperature region). This allows for deeper cathode access. The cell preferably operates at 250° C. to 700° C. such that the eutectic salt mixture or other electrolyte is maintained in a molten state. Fins 10 extend into the surrounding air to facilitate heat transfer to the air such that heat supplied to the core induces a temperature gradient radially outward that is maintained between tips 12 of the fins 10 and the molten lithium at the core of the cell.

Dissolved reaction product 11 generated during discharge will preferentially precipitate in the lower temperature regions of the fins as opposed to the warmer core region. Molten electrolyte reservoir 1 contains excess electrolyte 3 and electrolyte that has been displaced by reaction product as it is produced and deposited within fins 10. Reservoir 1 may be maintained at a temperature that is lower than the core of the cell such that the reaction product preferentially precipitates therein as well. The temperature of the reservoir is controlled by heater element 5. During recharge, reaction product re-dissolves into the molten salt electrolyte to maintain concentration equilibrium as product is electrolyzed and lithium is re-plated at the anode. Heater 5 is used during recharge to heat the electrolyte to redissolve reaction product. The heat source for core 6 of the cell is not shown but would maintain temperature for operation during both charge and discharge.

Reservoir 18 supplies lithium 14 to annular cavity 4 so that the cavity does not become depleted as the lithium is consumed during discharge. Similarly, as lithium is reduced into the annular section during recharge, lithium is resupplied and accumulated in the reservoir.

Figure 3:
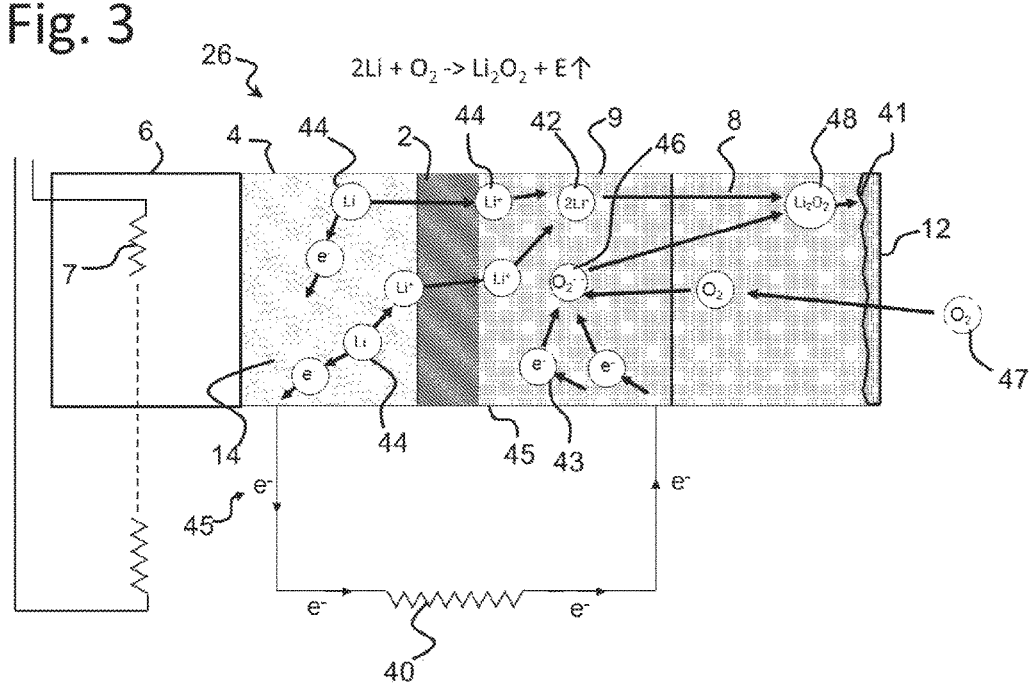
FIG. 3 is a schematic of a battery cell according to another embodiment of the present invention in discharge.
Figure 4:
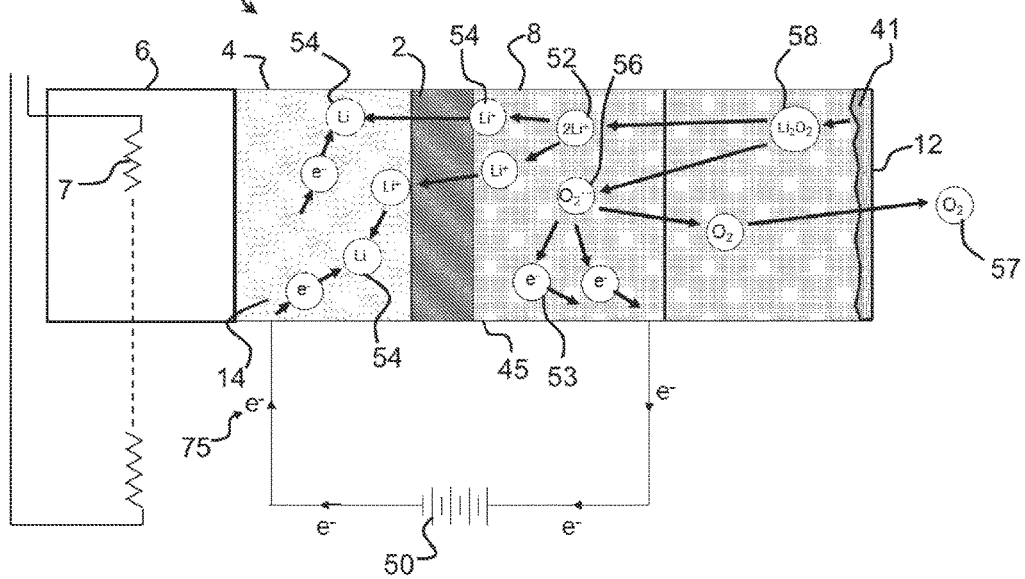
FIG. 4 is a schematic of the battery cell of FIG. 3 in recharge.

FIGS. 3 and 4 show expanded views of radial plane cross section 26 of the cell in FIG. 2 and illustrate the operation of the cell. These Figs. show heater/spacer 6 including heater element 7, finned cathode 8, annular lithium cavity 4, solid electrolyte cylinder 2 and molten lithium anode 14. Referring to FIG. 3, oxygen 47 dissolves into the molten salt electrolyte from the cell's environment. During discharge, lithium 44 is oxidized and conducted through electrolyte separator 2 into the molten salt contained within cathode 8, giving rise to electric current flow 45 through load 40 to cathode 8. The electrons 43 oxidize molecular oxygen that is dissolved in the molten salt electrolyte, producing oxygen ions 46 to complete the reaction, with the resulting reaction product being either lithium peroxide ($Li_2O_2$ as $2Li^+$ and $O_2^{--}$) and/or lithium oxide ($Li_2O$ as $2Li^+$ and $O^{--}$) ions suspended in the molten salt electrolyte solution. The two lithium ions 42 are anticipated to be individually dispersed within the electrolyte. The illustration is not intended to convey a diatomic pair bonded to each other. When the molten salt becomes saturated with reaction product, lithium peroxide 48 and/or lithium oxide begins to precipitate out of solution.

Heater element 7 located in the center region of the cell maintains the lithium anode and the electrolyte salt contained in the cathode in a molten state. Because of its location and because of the loss of heat from the cathode fins to the air surrounding the cell, a decreasing temperature exists between the core of the cell 6 and fin tips 12. The molar equilibrium of dissolved lithium/oxygen reaction product in the molten salt will be lower at the lower temperature fin tips 12 than at the high temperature cathode material 45 that is closest to the core of the cell. As such, reaction product 48 will tend to precipitate out of solution in the region of fin tips 12, resulting in a buildup of reaction product 41 in that location. Although reaction kinetics will favor the high temperature region, creation of reaction product in high temperature region 14 will cause over saturation and precipitation of reaction product in lower temperature fin tip region 12. Migration to fin tips 12 will occur because the molar concentration of reaction product in the salt is continuous between the two regions. The salt level will naturally be uniformly distributed, limited only by mass transport rate across the concentration gradients of the dissolved product within the molten salt. Further production of reaction products in the solution in the higher temperature regions will cause precipitation of reaction product in the lower temperature region since the increase would cause over saturation in the low temperature region.

Having the reaction product accumulate in the fin tip regions of the cell is important because precipitation in this region has only very limited adverse impacts on operation of the cell. The invention thus avoids over accumulation of reaction product in the active region of the cell which could cause a reduction of ionic conductivity and could block access and diffusion of oxygen to reaction sites.

FIG. 4 depicts recharge operation of the cell. For recharge, power source 50 is connected in the circuit in place of the load. Dissolved lithium/oxygen reaction product 52, 54, 56 is electrolyzed as electrons 53 are stripped by the power source and coupled to the anode side of the cell. During the process, molecular oxygen 57 is released to the environment and lithium ions 54 are conducted through the solid state separator 2 to the anode side of the cell where electrons 53 reduce it to lithium metal.

As reaction product 58 is consumed from the molten salt electrolyte solution, its molar concentration level in the electrolyte eutectic tends lower, thus allowing additional reaction product precipitant 41 to dissolve into the electrolyte. The re-dissolved reaction product naturally migrates toward the core region of the cell due to the concentration gradient created as reaction product in the core region is removed by the recharge process. Continuous dissolving of reaction product 41 maintains a molar equilibrium concentration level of the reaction product in the electrolyte in fin tip region 12 until all of discharge reaction product 41 is re-dissolved and electrolyzed, whereby the cell will be fully charged.

Figure 5:
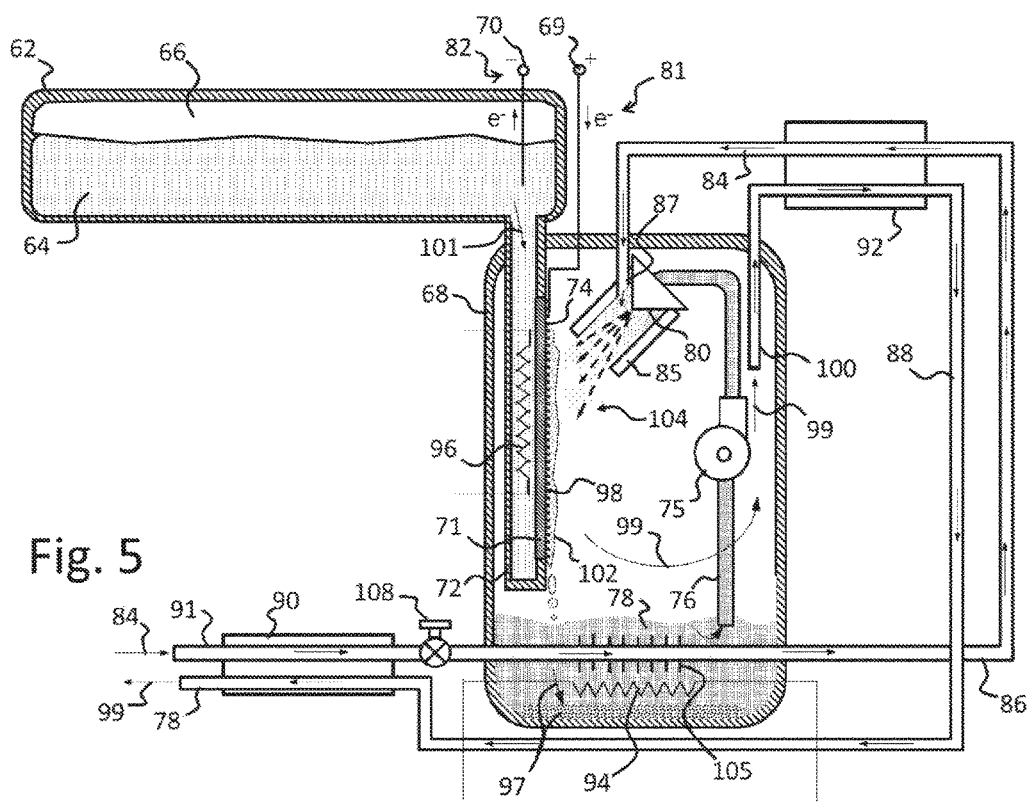
FIG. 5 is a schematic of a high performance battery cell according to a further embodiment of the invention in discharge.

FIG. 5 is a schematic diagram of a high performance lithium oxygen or lithium air cell according to a further embodiment of the invention. Lithium reservoir 62 contains molten lithium 64 at a preferred temperature of 350° C. A portion 72 of lithium reservoir 62 extends into reactor chamber 68 where separator 71 interfaces with the contents of chamber 68. Reservoir 62 optionally includes ullage pressurized gas 66 to ensure flow of molten lithium into contact with solid state electrolyte separator 71. Reservoir 62 maintains the supply 101 of lithium to separator 71 as the cell is discharged. Separator 71 is a solid lithium ion conductive material and may be lithium beta alumina or lithium lanthanum zirconium oxide (LLZO). It is preferably a solid ceramic and/or a glass electrolyte. Cathode 98 and embedded current collector 74 are coupled to the surface of separator 71 on the external side of reservoir 62. Cathode 98 includes lithium/oxygen reaction sites for charge and discharge of the cell. Current collector 74 is connected to positive terminal 69 which allows electrons 81 to travel. Power is applied to terminals 82. Reactor chamber 68 contains molten electrolyte 78. Pump 75 supplies electrolyte solution 78 through supply tube 76 to nozzle 80. Nozzle 80, tube 85 and port 87 comprise a jet pump whereby fluid supplied by pump 75 creates a low pressure region that draws air 84 into port 87 such that it flows through conduit 86 to port 87. The fluid injection process creates a turbulent mixture region of air and molten electrolyte. It produces a washing effect as the resulting spray 104 exits the jet pump and impinges on cathode 98. This process creates an electrochemical potential between the lithium inside reservoir 62 on one side of electrolyte 71 (electrode terminal 70) and the oxygen dissolved and dispersed within electrolyte/air mixture washing through cathode 98 on the other side.

Operation of the cell is such that molten salt electrolyte 102 washing through cathode 98 dissolves lithium-air reaction products produced therein as the cell is discharged. Oxygen depleted air 99 exits the reactor chamber through port 100. Air 84 enters the cell at port 91 and passes through heat exchanger 90, heat exchanger 105 and heat exchanger 92 prior to entering reaction chamber 68. The flow rate can be controlled by valve 108. The heat exchangers preheat air 84 to a level such that it enters nozzle 87 near the temperature of molten salt electrolyte 78 exiting nozzle 80. Air entering the reaction chamber 68 is heated within heat exchangers 90 and 92 by oxygen depleted air 99 exiting the reaction chamber through conduit 88. Air passing through heat exchanger 105 inside reactor 68 is heated by molten electrolyte salt 78. Extraction of heat from electrolyte 78 in the electrolyte reservoir maintains its temperature below the temperature of the electrolyte 102 that is washing through cathode 98. Electric heater 96 is thermally coupled to separator 71 and supplies energy as needed to maintain the temperature of cathode 98 above the temperature the reservoir electrolyte 78 that is thermally coupled to heat exchanger 105. The effect of the thus maintained temperature difference is that electrolyte 102 washing through cathode 98 is raised to a higher temperature than electrolyte 78 that is in the reservoir. Continuous flow of electrolyte continuously dissolves and washes away reaction product being produced in cathode 98. On the other hand, when the electrolyte leaves cathode 98 and is cooled by heat exchanger 105 in the reservoir, its saturation limit for dissolved reaction product decreases, which causes a portion of the reaction product to precipitate, 97. The electric heater 94 is used to control the temperature of the electrolyte. The discharge process continues as pump 75 resupplies electrolyte 78, now depleted of reaction product, to nozzle 80 where it entrains more air and carries it to cathode 98, is reheated, and dissolves more reaction product as it occurs from lithium air reactions ongoing therein.

Figure 6:
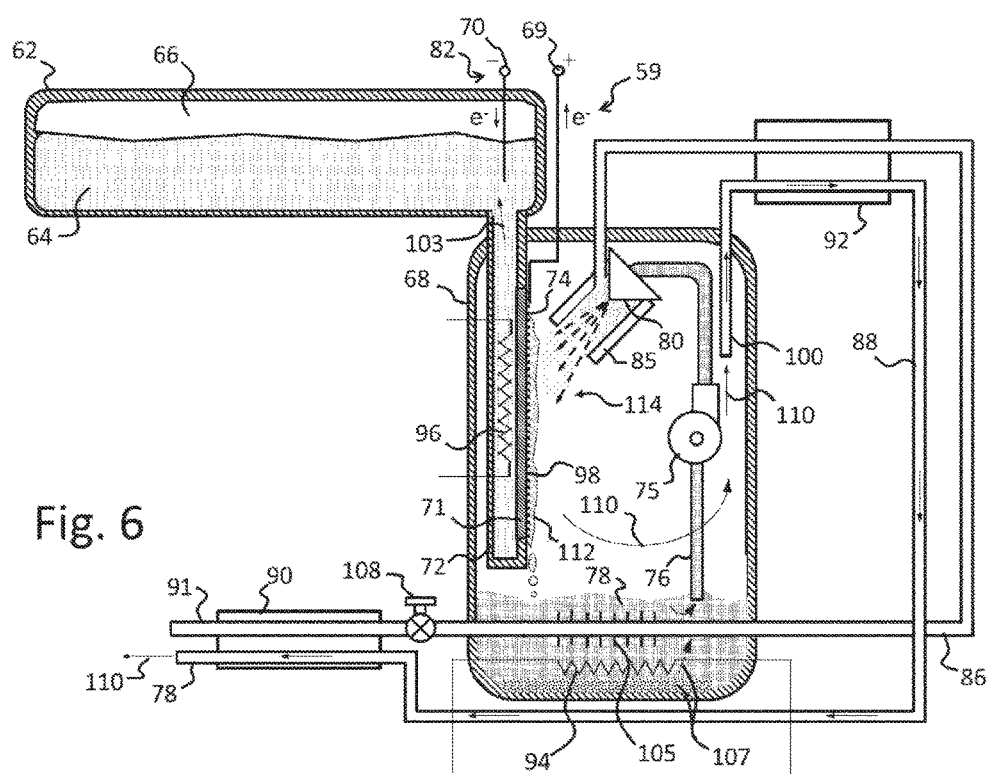
FIG. 6 is a schematic of a high performance battery cell of FIG. 5 in recharge.

FIG. 6 illustrates operation of the cell under recharge conditions. Power is supplied to heater 94 to increase the solubility level of reaction product 107 in electrolyte 78. The dissolving of reaction product 107 in electrolyte 78 increases with temperature. Pump 75 pumps electrolyte 78 containing dissolved reaction product to nozzle 80 whereby it is sprayed 114 onto cathode 98. Power is applied to terminals 82 to electrolyze lithium/air reaction product in cathode 98. With the extraction of electrons 59 by a positive voltage applied to terminal 69 relative to terminal 70, reaction product is electrolyzed with oxygen 110 being released to escape reactor chamber 68 via port 100. It exits the cell through port 78 after passing through heat exchanger 92 and 90 to preheat incoming air. During the recharge process, lithium ions are conducted through solid electrolyte separator 71 into reservoir 62 where it is reduced to lithium by electron flow via terminal 70. The recharge process continuously electrolyzes dissolved reaction product from molten salt in cathode 98 as reaction product depleted electrolyte 112 returns to reservoir 78, dissolves more reaction product, 107, and is pumped back to cathode 98. Molten lithium is re-supplied to reservoir 62 as indicated by arrow 103. Under recharge condition, valve 108 may optionally be closed since air intake into the reaction chamber is not needed.

Figure 7:
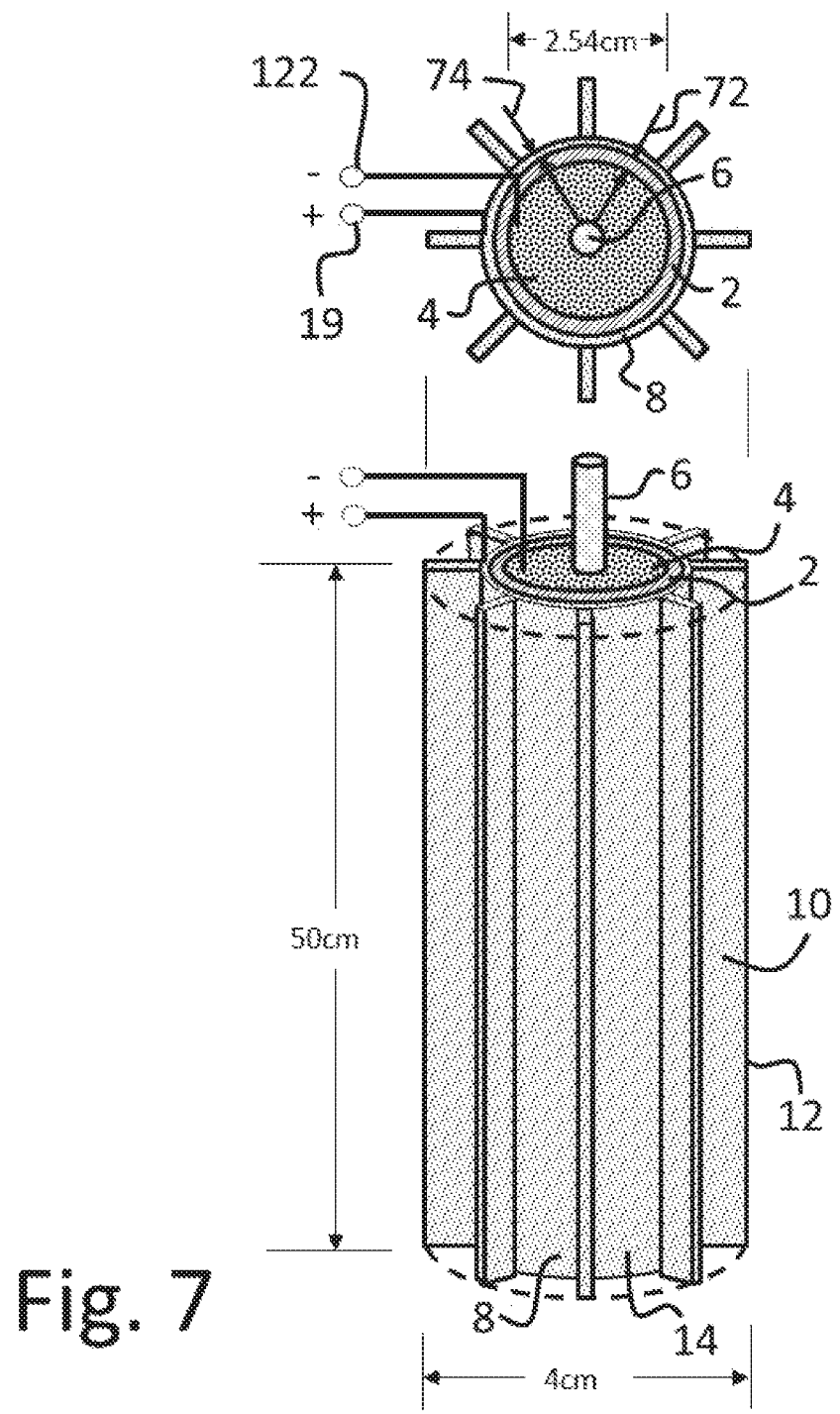
FIG. 7 is a schematic of a battery cell according to a further embodiment of the invention.

In an exemplary cell shown in FIG. 7, solid electrolyte cylinder 2 with terminals 122 and 19 has an inner diameter of 2.54 cm and length of 50 cm. The volume of lithium would be 0.253 L ($\pi(2.54(D)/2)^2 * 50$ cm(L)=253.35 cm$^3$). The electrochemical potential for the lithium/oxygen reaction is 3.14V. Assuming an under load operating output voltage of 2.5V to allow for internal impedances, the energy capacity can be determined considering the Amp-Hour capacity of lithium being 3,860 Ah/kg (2,084 Ah/ltr). At an output voltage of 2.5V, the energy available from the cell would be 9650 Wh/kg (5210 Wh/ltr). Given the 0.253 L lithium volume in the example, the cell could supply 1.3 kWh of energy.

In a cell operating at 300° C. with $NaNO_3$—$KNO_3$ molten salt eutectic electrolyte, the conductivity of the electrolyte is 0.66 S/cm. Similarly, the conductivity of the solid electrolyte containment cylinder 2 at 300° C. is 0.1 S/cm as shown in FIG. 7. Assuming that the thickness 74 in FIG. 7 of the porous cathode 8 on the surface of the solid cylinder electrolyte 2 is 0.2 cm and that the thickness 72 of the solid electrolyte is 0.1 mm, the area specific resistance of the solid electrolyte plus the liquid can be calculated as 0.403 Ohm-$cm^2$ (1/(0.66 S/cm)*0.2 cm+1/(0.1 S/cm)*0.01 cm). Given the 0.7 Volt allowance for internal IR loss, the net output current under load would be 1.73 A assuming other polarization losses are negligible. In such a case, the area specific power of the cell would be 4.34 Watts. This example cell has a surface area of 399 $cm^2(\pi*2.54*50)$, therefor its power output capability would be 1.73 kW.

Figure 8:
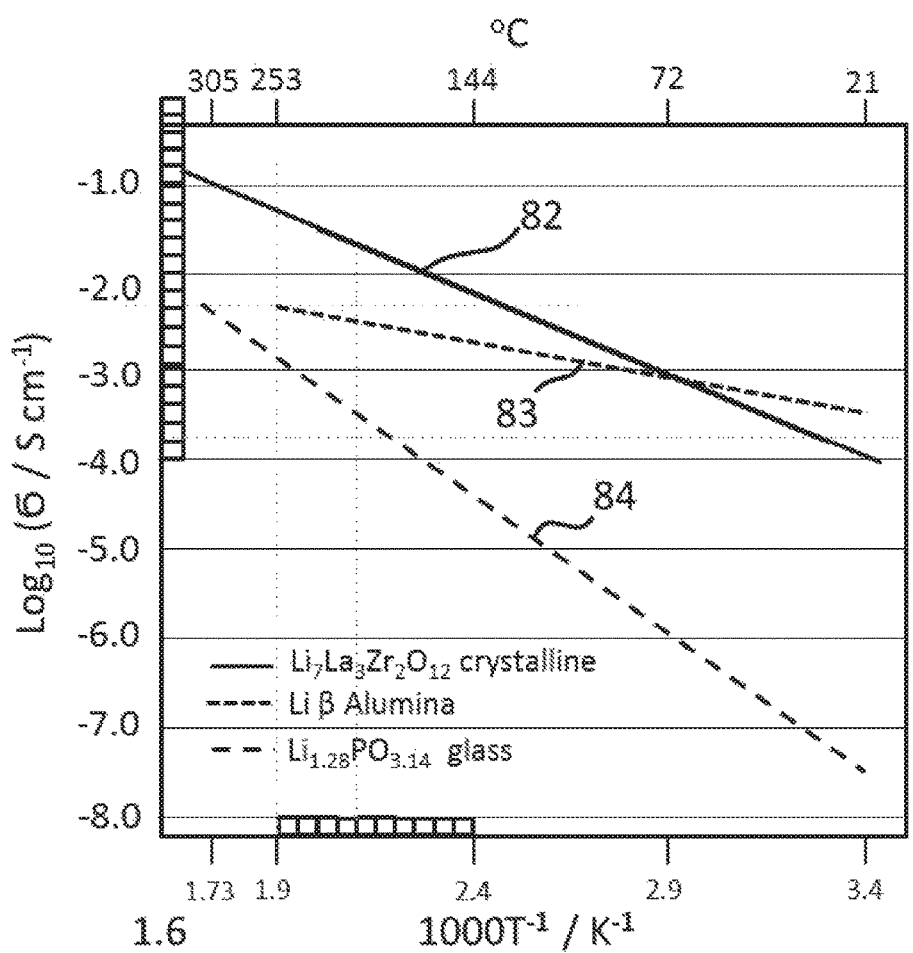
FIG. 8 is an Arrhenius plot showing lithium ion conductivities of several solid ceramic electrolytes.

FIG. 8 is an Arrhenius plot showing the conductivity of several solid state ionic conductive materials that would be suitable for use as the electrolyte cylinder 2. Impedance line 83 is for lithium beta alumina (data from J. L. Briant, *J. Electrochem. Soc.: Electrochemical Science And Technology;* 1834 (1981)) and line 84 is for lithium phosphate glass (data from B. Wang, *Journal of Non-Crystalline Solids,* Volume 183, Issue 3, 2; 297-306 (1995). Conductivity values 82 for aluminum oxide doped lithium lanthanum zirconium oxide ($Al_2O_3$:$Li_7La_3Zr_2O_{12}$) are from M Kotobuki, et. al.; *Journal of Power Sources* 196 7750-7754 (2011)).

Sintered LLZO electrolyte had been demonstrated to be stable with lithium in all solid state batteries. (See T. Yoshida, et. al.; *Journal of The Electrochemical Society,* 157-10, A1076-A1079 (2010)). The cyclic voltammogram of the Li/LLZO/Li cell showed that the dissolution and deposition reactions of lithium occurred reversibly without any reaction with LLZO. This indicates that a Li metal anode can be employed in contact with LLZO electrolyte.

In an exemplary embodiment, a 1 kWh battery is designed to operate at a discharge rate of 1 C, i.e. battery totally discharged in 1 hour. Lithium has a specific energy of 11,580 Wh/kg. If the mass of the oxygen is included, the net energy density is 5,200 Wh/kg. For a 1 kWh battery, 86 g of lithium would be needed. Lithium has a discharge current capacity of 3.86 Ah/g. At a discharge rate of 1 C, the required discharge current would be 332 A (86 g*3.86 Ah/g/1 hr). In this example, the area of the separator may be defined as 100 $cm^2$ and the solid separator as LLZO or other suitable substitute thereof. In this example the use of a 100 $cm^2$ separator results in a net current density of 3.32 $A/cm^2$. As indicated in FIG. 8, the lithium ion conductivity, σ, of LLZO is approximately 0.1 S/cm. A separator made of this material and at a thickness, t, of 100 um would have an impedance of 0.1 Ohm-$cm^2$, (1/σ*t). The output current supplied at 1 C would have a maximum drop in voltage of 0.4V relative to the cell's open circuit voltage. The primary reaction product of the cell is $Li_2O_2$. The amount of air flow required to sustain a 1 C discharge rate can be determined from the required oxygen flow.

The atomic mass of lithium is 6.9 g/mole. The primary discharge reaction for the cell is $2Li+O_2>Li_2O_2$, 1 mole of oxygen is required for per mole of lithium. The number of moles of lithium in the reaction is 12.46, (86 g/6.9 g/mole). Therefore, 6.23 moles or 199.4 grams (6.23 moles *32 grams/mole) of oxygen are required to balance the reaction. Air is 23% oxygen by mass so that the total amount of air needed for the reaction is 866 g, (199.4 g $O_2$/(0.23 g $O_2$/gAir). For the 1 C discharge, the air mass flow rate is 866 g/hr or 0.24 g/sec. The density of air is 0.00123 $g/cm^3$. This gives a volumetric flow rate of 195 $cm^3$/sec.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A rechargeable lithium air battery comprising a ceramic separator forming an anode chamber, a molten lithium anode contained in the anode chamber, an air cathode, a non-aqueous electrolyte, and an electrolyte reservoir adjacent to the cathode, wherein the cathode has a temperature gradient comprising a low temperature region and a high temperature region, and wherein the temperature gradient provides a flow system for reaction product produced by the battery.

2. The battery according to claim 1, further comprising a pump and a temperature control system.

3. The battery according to claim 2, wherein the pump controls movement of the electrolyte between the cathode and the electrolyte reservoir.

4. The battery according to claim 2, wherein the temperature control system controls temperatures of the cathode and the electrolyte reservoir.

5. The battery according to claim 1, wherein during discharge the reaction product moves from the high temperature region of the cathode to the low temperature region of the cathode.

6. The battery according to claim 1, wherein the electrolyte comprises a molten inorganic salt.

7. The battery according to claim 1, wherein the electrolyte comprises a silane or siloxane compound.

8. The battery according to claim 1, wherein the cathode comprises a porous ceramic material.

9. The battery according to claim 8, wherein the cathode is impregnated with a metal nitride or a carbon material.

10. The battery according to claim 1, wherein the cathode comprises an electrically conductive sintered metal oxide, metal nitride, carbon, or silicon carbide.

11. The battery according to claim 1, wherein the cathode comprises carbon, a polymer binder, and a metal oxide.

12. The battery according to claim 8, wherein the porous ceramic material comprises lithium lanthanum zirconium oxide.

13. The battery according to claim 1, where the anode chamber is maintained at about 20° C. to 200° C.

14. The battery according to claim 1, wherein the ceramic separator comprises a lithium ion conducting glass.

15. The battery according to claim 14, wherein the lithium ion conducting glass is selected from lithium beta alumina, lithium phosphate glass, lithium lanthanum zirconium oxide, $Al_2O_3$:$Li_7La_3Zr_2O_{12}$, lithium aluminum germanium phosphate, and lithium aluminum titanium phosphate.

16. The battery according to claim 1, wherein the battery has an operating temperature of about 200° C. to about 450° C.

17. A rechargeable lithium air battery comprising a ceramic separator forming an anode chamber, a molten lithium anode and a heater contained in the anode chamber, an air cathode, and a non-aqueous electrolyte, wherein the cathode has a temperature gradient comprising a low temperature region and a high temperature region, and wherein the temperature gradient provides a flow system for reaction product produced by the battery.

18. A rechargeable lithium air battery comprising a ceramic separator forming an anode chamber, a molten lithium anode contained in the anode chamber, an air cathode, and a non-aqueous electrolyte, wherein the cathode has a temperature gradient comprising a low temperature region and a high temperature region, the temperature gradient provides a flow system for reaction product produced by the battery, wherein the cathode comprises a core adjacent to the ceramic separator and at least one fin extending radially outward from the core, and wherein the core is the high temperature region of the cathode and the at least one fin is the low temperature region of the cathode.

19. A rechargeable lithium air battery comprising a ceramic separator forming an anode chamber, a molten lithium anode contained in the anode chamber, an air cathode, a non-aqueous electrolyte, an electrolyte reservoir adjacent to the cathode, a pump and a temperature control system, wherein the temperature control system controls temperatures of the cathode and the electrolyte reservoir, the temperature of the electrolyte reservoir is about 200° C. to about 450° C., the cathode has a temperature gradient comprising a low temperature region and a high temperature region, and wherein the temperature gradient provides a flow system for reaction product produced by the battery.

\* \* \* \* \*